(12) United States Patent
Dunneback

(10) Patent No.: US 7,033,454 B2
(45) Date of Patent: Apr. 25, 2006

(54) LAMINATED METALS SHEET COMPOSITE AND METHOD FOR MAKING SUCH SHEET

(75) Inventor: Mark Dunneback, Macomb Township, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 253 days.

(21) Appl. No.: 10/310,782

(22) Filed: Dec. 6, 2002

(65) Prior Publication Data

US 2004/0110437 A1 Jun. 10, 2004

(51) Int. Cl.
*B32B 37/00* (2006.01)
*B32B 37/18* (2006.01)
*B60J 5/00* (2006.01)
*B60J 10/08* (2006.01)

(52) U.S. Cl. .................. 156/182; 156/250; 156/256; 156/299; 296/146.5; 52/784.1; 428/31

(58) Field of Classification Search .................. 156/60, 156/182, 297, 299, 220, 222, 250, 256, 298; 52/784.1, 783.1, 784.4; 296/146.1, 146.5, 296/146.6, 146.7; 428/31; 442/2, 6
See application file for complete search history.

(56) References Cited

U.S. PATENT DOCUMENTS

| 1,770,521 A | * | 7/1930 | Hayes | 428/217 |
| 6,119,422 A | * | 9/2000 | Clear et al. | 52/309.8 |
| 2004/0169395 A1 | * | 9/2004 | Chevli et al. | 296/146.5 |

FOREIGN PATENT DOCUMENTS

JP 2001206162 A * 7/2001

* cited by examiner

*Primary Examiner*—Sue A. Purvis
(74) *Attorney, Agent, or Firm*—Thomas A. Jurecko

(57) ABSTRACT

A composite product for use in a motor vehicle body and a method and apparatus for producing that product is disclosed. The product has a first blank with a predetermined thickness, a second blank with a predetermined thickness and dimensioned to provide the composite product with a combined thickness of the first and second blanks only in at least one required area of the composite product. A wire mesh layer is provided between the first and second blanks. An adhesive is selected to bond the first and second blanks together with the wire mesh layer interposed therebetween.

6 Claims, 2 Drawing Sheets

LAMINATED METALS SHEET COMPOSITE AND METHOD FOR MAKING SUCH SHEET

BACKGROUND OF THE INVENTION

The present invention relates to tailor-laminated metal sheet composites, and more particularly, to laminated metal sheet composites for use in motor vehicle door panels and the like in which stamped, thin sheet metal parts are bonded together into layers for meeting specific end-use requirements. The present invention also relates to the method and apparatus for making the aforementioned composites.

Composites used in the production of various vehicle parts and building components are well known as shown, for example, in U.S. Pat. Nos. 5,494,737, 6,258,438; 6,205,728; and 6,468,613. In current vehicle construction, tailor-made composites such as that shown in FIG. 5 are typically made of two blanks that are laser-welded at their edges to form a particular shape. This requires a blank A of much greater thickness, say 1.68 mm, than the thickness of blank B. In order to minimize problems resulting from poor welding, edge preparation of such blanks is very important. This preparation undesirably increases production costs and does not completely eliminate sealing problems which are inherent in multiple welded surfaces. Moreover, inconsistencies even in laser-welding result in noise, vibration and harshness (NVH) problems that detract from riding comfort. Conventional composites so produced are also undesirably heavy and increase vehicle weight.

SUMMARY OF THE INVENTION

The present invention has the object of overcoming the problems and disadvantages in tailor-made vehicle body composites and the method of producing them. More specifically, an aim of the present invention is to produce a tailor-made reinforced metal composite that substantially improves NVH qualities due to improved integrity, simplifies that production and reduces manufacturing costs.

The foregoing object and aim have been achieved by replacing the above-described conventional laser-welded blanks with a blank comprised of two structural sheets used, for example, as an inner door panel of a vehicle and bonded by an adhesive. As a result, instead of laser-welding the edge of a thicker blank A to the edge of a thinner blank B as on the conventional design shown in FIG. 5, two thinner blanks can be laminated to form a composite of the desired thickness without sacrificing structural integrity, formability, weldability and NVH reduction.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 4:
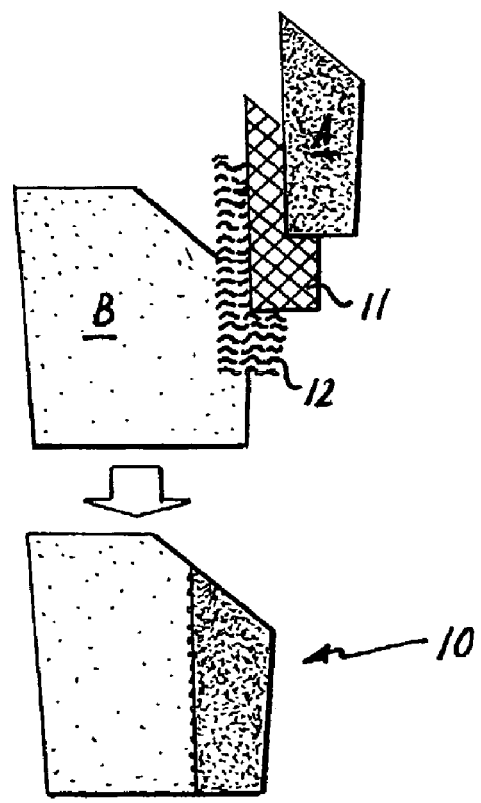
FIG. 4 is a view of one of the finished right-hand blanks in accordance with the present invention, as well as exploded to illustrate the several individual components.
Figure 5:
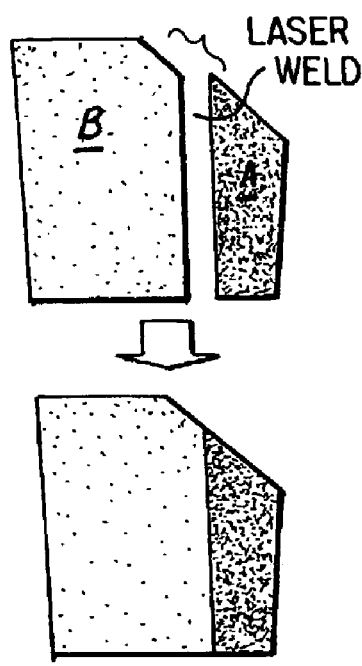
FIG. 5 is a view similar to FIG. 4, but showing the conventional laser-welded blank discussed above.

Referring to the drawings and, in particular, to FIG. 4, the tailor-laminated model sheet composite blank in accordance with the present invention is designated generally by the numeral 10. In the illustrated embodiment, the composite blank 10 is a right-hand blank used, in this case, as a panel on the right side of the vehicle. Of course, it is to be understood that the blank can be tailored to any size and shape for vehicle body panels and components without departing from the scope of the present invention. As seen in the upper portion of FIG. 4, the composite blank 10 consists of a small blank A having, say, a thickness of 0.60 mm, a larger blank B having a thickness of, say, 0.76 mm, a wire mesh piece 11 having a size and shape corresponding to blank A and a suitable conventional structural adhesive 12 to bond the wire mesh piece 11 and blanks A,B to form the composite blank shown in the lower portion of FIG. 4.

Figure 1:
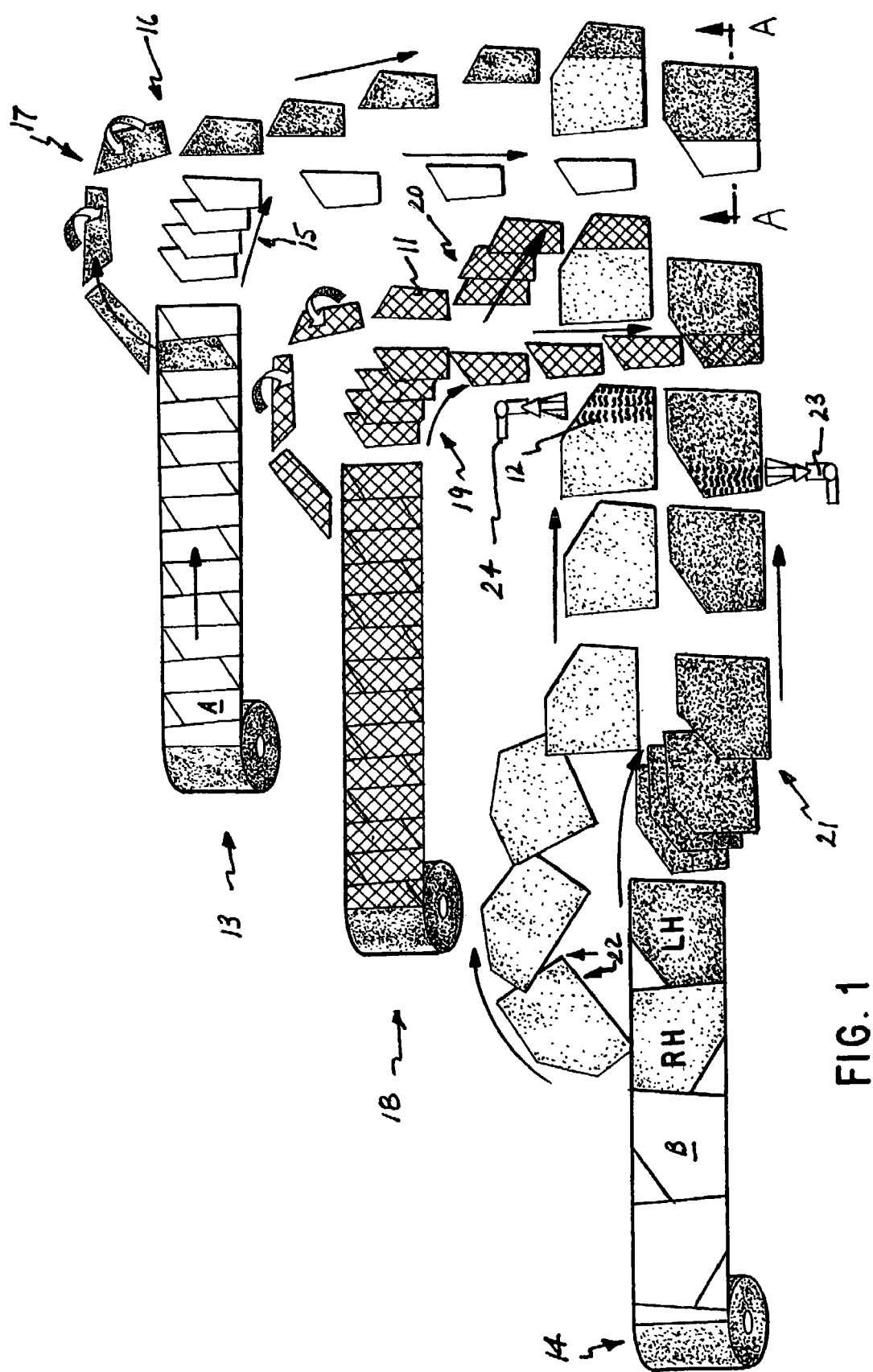
FIG. 1 is a schematic view of how right-hand and left-hand tailor-made composite blanks for the right and left sides of a motor vehicle are produced in accordance with the present invention.
Figure 3:
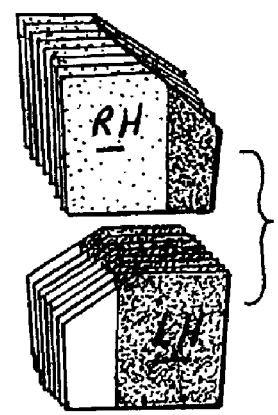
FIG. 3 is a view showing the stacks of finished right- and left-hand blanks produced by the method of FIG. 1.

The blank 10 in FIG. 4 is produced by the production method and apparatus schematically shown in FIG. 1. Two thin metal coil lines 13, 14 are provided. A coil of think metal material having a thickness of, for example, 0.64 mm, is unrolled from conventional equipment in line 13, in the rightward direction as shown by the arrow in FIG. 1, from which the smaller blanks (blank A in FIG. 4) are cut for the completed right- and left-hand (RH, LH, respectively) composite blanks shown in FIG. 3. Using conventional stamping techniques, the unrolled sheet material is cut into the smaller blanks A and separated into left-hand (LH) and right-hand (RH) columns designated generally by numerals 15, 16. The LH blanks A in column 15 are moved downwardly, as shown by the thin arrows, to an assembly station for building the left-hand (LH) engineered or tailored blank. The RH blanks in column 16 are first turned over 180? at point 17 (the broad arrows) before being moved downwardly as shown by the thin arrow to an assembly station for building the right-hand tailored finished composite blank.

A separate wire mesh line designated generally by numeral 18 is also provided between the two metal lines 13, 14. A coil of thin steel wire mesh of, say, 0.70 mm, is unrolled on the line 18 substantially in-line with the materials being formed on lines 13, 14 by stamping or the like into the larger and smaller blanks A, B (FIG. 4). The wire mesh in the illustrated embodiment is also formed into blanks 11 of a size and shape similar to that of the blanks A in line 13. The mesh blanks are then separated, like the blanks A, into two columns 19, 20 with the ones in column 20 being turned over 180? as shown by the broad arrows like the blanks A in column 16.

Figure 2:
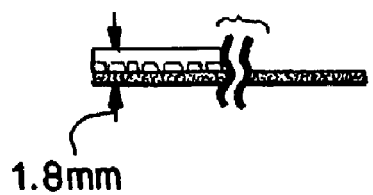
FIG. 2 is a sectional view along line A—A of FIG. 1.

Similar to the operations in lines 13 and 18, thin metal material is unrolled from the coil in line 14 to stamp out or otherwise form the larger blanks B (FIG. 4). After stamping, the right- and left-hand blanks are separated into two separate lines 21, 22, neither of which is turned over, and moved in the direction of the arrows to the respective assembly stations for building the composite. Prior to arrival at the assembly station and upstream of the point at which the wire mesh blanks in lines 19, 20 are joined to the blank B, robotic adhesive station 23, 24 are located to apply an appropriate adhesive material shown by rows of curved lines 12 on the blank B (see also FIG. 4). After applying the adhesive 12, the two rows of blank B are moved to stations where the wire mesh 11 and then the blank A are assembled together to form the finished LH composite blank whose cross-section is shown in FIG. 2.

As a result of this new technique for building a novel composite structure, the present invention results in a blank assembly that has structural integrity, is easily formable and weldable, and has improved NVH properties. The blanks A, B can be of the same or different material and/or thicknesses, thereby achieving maximum "tuning" of product characteristics to optimize performance and meet specs. Because the primary and secondary sealing surfaces are constituted by one surface, the present invention avoids a poor welding condition of the final product. Edge preparation for the finished product is unnecessary, or at least as critical as in the past, so that a more robust product results. NVH properties, most notably acoustics, are improved because of the dampening provided by the bonding adhesive. Finally, costly laser welding is eliminated, and cost efficiency results from providing double thickness material only where required.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A method of producing a composite blank for use in making a motor vehicle body, comprising:
    producing at least one first blank having a predetermined thickness, comprising:
        unrolling a coil of thin metal;
        forming a plurality of first blanks such that adjacent first blanks are oriented in opposite directions relative to a direction of the unrolling;
        separating the adjacent first blanks into two columns, in each of which columns the first blanks have the same orientation; and
        applying adhesive to at least one area of the first blanks in each column and moving the two columns of the first blanks to an assembly location;
    producing at least one second blank having a predetermined thickness and being shaped to provide the composite blank with a combined thickness of the first and second blanks in at least one required area of the composite blank;
    supplying at least one wire mesh member having a shape and size similar to the at least one second blank; and
    joining the at least one first and second blanks with the at least one wire mesh member interposed therebetween by adhesive bonding.

2. A method according to claim 1, wherein the producing of the at least one wire mesh member comprises unrolling a coil of wire mesh material; forming a plurality of wire mesh members such that adjacent wire mesh members are oriented in opposite directions relative to a direction of the unrolling; separating the adjacent wire mesh members into two columns, in each of which columns the wire mesh member have the same orientation; turning one of the columns of the wire mesh members by 180° so that the wire mesh members in one of the columns are oriented as mirror images of the wire mesh members in the other column; and moving the two columns of the wire mesh members to an assembly location.

3. A method according to claim 1, wherein the producing of the at least one second blank comprising unrolling a coil of thin metal; forming a plurality of second blanks such that adjacent second blanks are oriented on opposite directions relative to a direction of the unrolling; separating the adjacent second blanks into two columns, in each of which columns the second blanks have the same orientation; turning one of the columns of the second blanks by 180° so that the second blanks in one of the columns are oriented as mirror images of the second blanks in the other column, and moving the two columns of the second blanks to an assembly location.

4. A method according to claim 1, wherein the producing of the at least one wire mesh member comprises unrolling a coil of wire mesh material; forming a plurality of wire mesh members such that adjacent wire mesh members are oriented in opposite directions relative to a direction of the unrolling; separating the adjacent wire mesh members into two columns, in each of which columns the wire mesh member have the same orientation; turning one of the columns of the wire mesh members by 180° so that the wire mesh members in one of the columns are oriented as mirror images of the wire mesh members in the other columns, and moving the two columns of the wire mesh members to the assembly location.

5. A method according to claim 4, wherein the producing of the at least one second blank comprising unrolling a coil of thin metal; forming a plurality of second blanks such that adjacent second blanks are oriented on opposite directions relative to a direction of the unrolling; separating the adjacent second blanks into two columns, in each of which columns the second blanks have the same orientation, turning one of the columns of the second blanks by 180° so that the second blanks in one of the columns are oriented as mirror images of the second blanks in the other column, and moving the two columns of the second blanks to the assembly location.

6. A method according to claim 5, wherein the joining takes place at the assembly location.

* * * * *